US012416393B1

(12) United States Patent
Xin

(10) Patent No.: US 12,416,393 B1
(45) Date of Patent: Sep. 16, 2025

(54) BREATHING LAMP

(71) Applicant: SHENZHEN YIXIU TECHNOLOGY CO., LTD, Shenzhen (CN)

(72) Inventor: Yuanting Xin, Shenzhen (CN)

(73) Assignee: SHENZHEN YIXIU TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 19/189,408

(22) Filed: Apr. 25, 2025

(51) Int. Cl.

| | |
|---|---|
| ***F21V 15/01*** | (2006.01) |
| ***A63H 3/00*** | (2006.01) |
| ***F21V 3/06*** | (2018.01) |
| ***F21V 23/04*** | (2006.01) |
| ***F21Y 115/10*** | (2016.01) |

(52) U.S. Cl.
CPC .......... *F21V 15/012* (2013.01); *F21V 3/0625* (2018.02); *F21V 23/04* (2013.01); *A63H 3/001* (2013.01); *F21Y 2115/10* (2016.08)

(58) Field of Classification Search
CPC ..... F21V 15/012; F21V 3/0625; A63H 3/001; A63H 3/006
See application file for complete search history.

(56) References Cited

U.S. PATENT DOCUMENTS

| | | | | | |
|---|---|---|---|---|---|
| 3,014,312 | A * | 12/1961 | Convertine | A63H 3/001 | 446/295 |
| 5,393,259 | A * | 2/1995 | Lee | A63H 13/00 | 446/298 |
| 2012/0052470 | A1 * | 3/2012 | Woerlee | G09B 23/288 | 434/265 |
| 2013/0040532 | A1 * | 2/2013 | Khubani | A63H 3/02 | 446/369 |
| 2019/0259304 | A1 * | 8/2019 | Schwindt | A63H 3/001 | |
| 2021/0046392 | A1 * | 2/2021 | Ray | A61B 5/486 | |
| 2022/0113001 | A1 * | 4/2022 | Huang | F21V 3/049 | |
| 2024/0058714 | A1 * | 2/2024 | Xu | A63H 33/26 | |

* cited by examiner

*Primary Examiner* — Eric T Eide
(74) *Attorney, Agent, or Firm* — JEEN IP LAW, LLC

(57) ABSTRACT

The present invention relates to the field of lamp technologies, and discloses a breathing lamp, including a housing, a base, and a light-emitting component. The housing is connected to the base. The light-emitting component is mounted on the base. The housing is made of a flexible material. A drive mechanism and a transmission mechanism are further mounted on the base. A pull rod is connected between the transmission mechanism and the housing. The drive mechanism drives the pull rod through the transmission mechanism to induce deformation of the housing. This application features a simple structure, convenient mounting, and great fun. Driven by the drive mechanism, the pull rod of the device induces deformation of the housing to form a dynamic breathing effect, and the pull rod and the housing can be automatically reset.

16 Claims, 10 Drawing Sheets

BREATHING LAMP

CROSS-REFERENCE TO RELATED APPLICATIONS

This application claims priority to Chinese Patent Application No. 202510017652.4, filed on Jan. 6, 2025, which is hereby incorporated by reference in its entirety.

TECHNICAL FIELD

The present invention relates to the field of lamp technologies, and in particular, to a breathing lamp.

BACKGROUND

With the improvement of living standards, night lamps have gained increasing popularity in the market. Currently, silicone night lamps available on the market are primarily used for illumination and often remain in static display states after being placed in homes, resulting in limited functionality. To enhance the fun, related playful designs have emerged in existing technologies. For example, night lamps emit light of different colors through the design of smart lights, or vibration-based color changes are caused by tapping a silicone housing, or deformation in a silicone housing is caused by tapping the silicone housing. In general, night lamp products in existing technologies still lack sufficient interactivity and playability. In view of this, there is an urgent need to improve existing silicone night lamps.

SUMMARY

Based on the above, an objective of the present invention is to provide a breathing lamp that features a simple structure, convenient mounting, and great fun. Driven by the drive mechanism, the pull rod of the device induces deformation of the housing to form a dynamic breathing effect, and the pull rod and the housing can be automatically reset.

To achieve the foregoing objective, the following technical solutions are used in the present invention:

A breathing lamp includes a housing, a base, and a light-emitting component. The housing is connected to the base. The light-emitting component is mounted on the base. The housing is made of a flexible material. A drive mechanism and a transmission mechanism are further mounted on the base. A pull rod is connected between the transmission mechanism and the housing. The drive mechanism drives the pull rod through the transmission mechanism to induce displacement in a vertical direction.

Preferably, the drive mechanism is a motor, the transmission mechanism includes a first pulley, a second pulley, and a belt, the first pulley is connected to an output shaft of the motor, and the belt is wrapped around the first pulley and the second pulley.

Preferably, a first retaining member is provided on the housing, a second retaining member is provided at a position of the second pulley that deviates from an axis, and both ends of the pull rod are respectively connected to the first retaining member and the second retaining member.

Preferably, a lampshade is further mounted on the base, a first opening is provided in the lampshade, and the pull rod is connected to the housing after passing through the first opening.

Preferably, the lampshade is made of a transparent frosted material or a translucent frosted material.

Preferably, a plurality of inverted "L"-shaped hooks are respectively provided on both sides of the base, a plurality of first bayonet holes are provided in the lampshade, and each of the inverted "L"-shaped hooks is clamped to one of the first bayonet holes.

Preferably, an annular groove is provided at a bottom of the housing, a plurality of second bayonet holes are provided in a side wall of the annular groove, the base is inserted in the annular groove after being assembled with the lampshade, and a hook portion of the inverted "L"-shaped hook is inserted in one of the second bayonet holes after passing through the first bayonet hole.

Preferably, the housing includes a first region portion connected to the base and a second region portion not connected to the base, and a thickness of the second region portion is less than or equal to a thickness of the first region portion.

Preferably, a ventilation hole is provided in the housing.

Preferably, the pull rod is a spring pull rod.

Preferably, a support column is further provided on the base, and the light-emitting component is mounted on the support column.

Preferably, the light-emitting component is an LED light board, and two LED light boards are provided, and are respectively arranged on both sides of the base.

Preferably, a power supply, a power switch, and a sensor are further provided on the base; and when the power switch is turned off, if the sensor senses that the pull rod is in a non-preset position, the sensor emits an electrical signal to enable the drive mechanism to drive the pull rod to a preset position through the transmission mechanism.

Preferably, the sensor is a through-beam photoelectric switch, and a positioning member is further provided on the first pulley or the second pulley; and when the power switch is turned off, if the electrical signal emitted by the through-beam photoelectric switch fails to act on the positioning member, the drive mechanism operates and drives the first pulley and/or the second pulley to rotate to change a position of the positioning member until the electrical signal emitted by the through-beam photoelectric switch successfully acts on the positioning member.

Preferably, a speaker is further mounted on the base, and the power supply is electrically connected to the light-emitting component, the speaker, and the sensor respectively.

Preferably, the power supply is a cylindrical battery, which is mounted obliquely on the base.

Preferably, the housing and the first retaining member are integrally formed.

Compared with existing technologies, the present invention has the following beneficial effects:

(1) The technical solution includes the housing, the base, and the light-emitting component. The pull rod is connected between the transmission mechanism and the housing. Since the housing is made of a flexible material (for example, silicone, or rubber), the pull rod of the device is driven by the drive mechanism to induce deformation of the housing, thereby forming a dynamic breathing effect.

(2) In the technical solution, the plurality of inverted "L"-shaped hooks are respectively provided on both sides of the base, and the plurality of first bayonet holes are provided in the lampshade. The annular groove is provided at the bottom of the housing. The plurality of second bayonet holes are provided in the side wall of the annular groove. The base is inserted in the annular groove after being assembled with the lampshade. The hook portion of the inverted "L"-shaped hook is inserted in one of the second bayonet holes after passing through the first bayonet hole. In this way, the device is convenient to mount, and only the inverted "L"-shaped hooks need to be provided to connect the base to both the lampshade and the housing. Further, in the foregoing assembly manner, the base may be mounted horizontally, and when using a product protected by the technical solution, horizontal placement can be achieved through the base.

(3) In the technical solution, the through-beam photoelectric switch and the positioning member are provided, so that after the power switch is turned off, the pull rod and the housing can be automatically reset. Specifically, the positioning member is provided on the first pulley or the second pulley. When the power switch is turned off, if the electrical signal emitted by the through-beam photoelectric switch fails to act on the positioning member, the drive mechanism operates and drives the first pulley and/or the second pulley to rotate to change the position of the positioning member until the electrical signal emitted by the through-beam photoelectric switch successfully acts on the positioning member. Therefore, when the device does not operate, the shape of the housing is restored, thereby enhancing the aesthetic appeal and decorative value of the breathing lamp in its static state.

(4) The ventilation hole is provided in the housing of the technical solution to achieve air pressure balance inside and outside the housing. Under the action of the vertical movement of the pull rod, the base is prevented from detaching easily under the action of internal pressure during the rising and falling of the housing, and the difficulty for the shape of the housing to be automatically restored due to pressure imbalance is avoided.

BRIEF DESCRIPTION OF THE DRAWINGS

For clearer descriptions of the technical solutions in the embodiments of the present invention, the following briefly introduces the accompanying drawings required for describing the embodiments of the present invention. Apparently, the accompanying drawings in the following description show merely some embodiments of the present invention, and persons of ordinary skill in the art may still derive other drawings from the content of the embodiments of the present invention and these accompanying drawings without creative efforts.

REFERENCE NUMERALS

Figure 1:
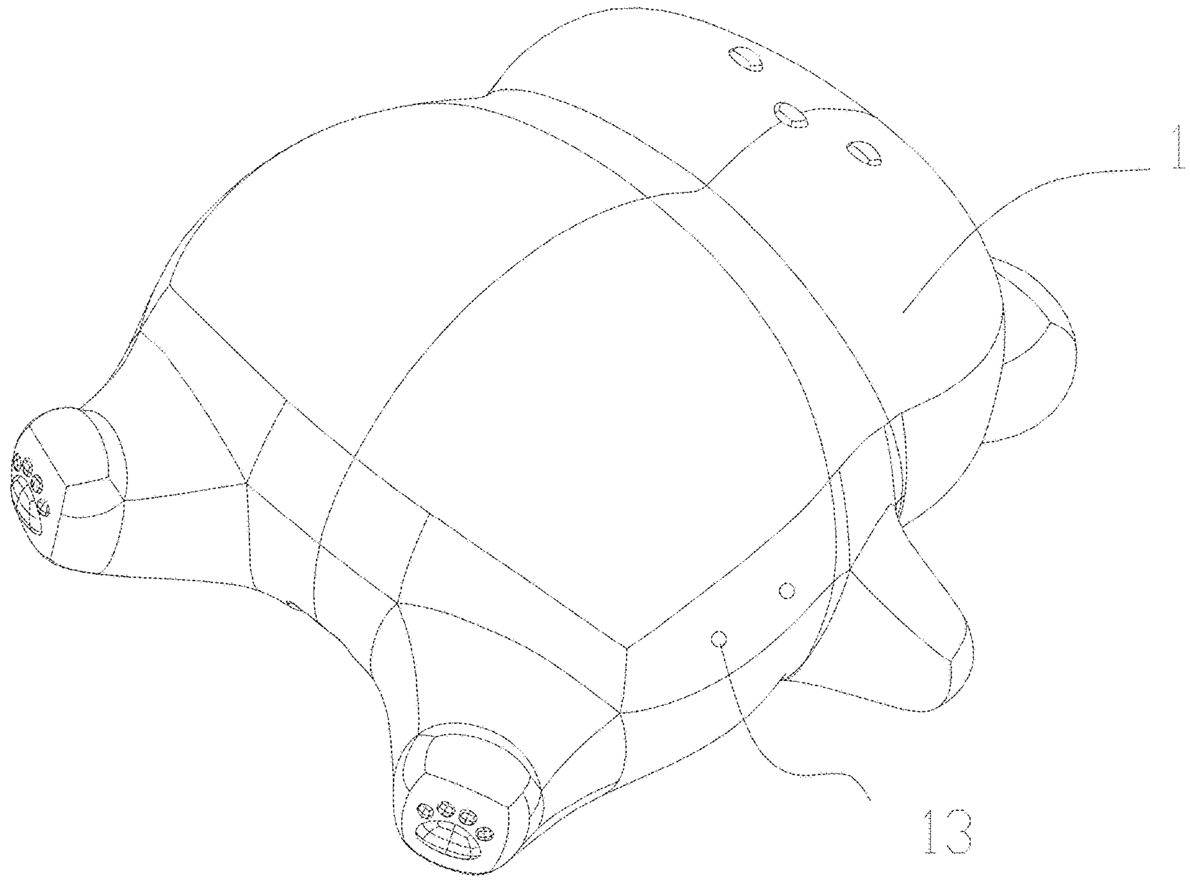
FIG. 1 is an overall schematic structural diagram 1 of a breathing lamp according to the present invention.
Figure 2:
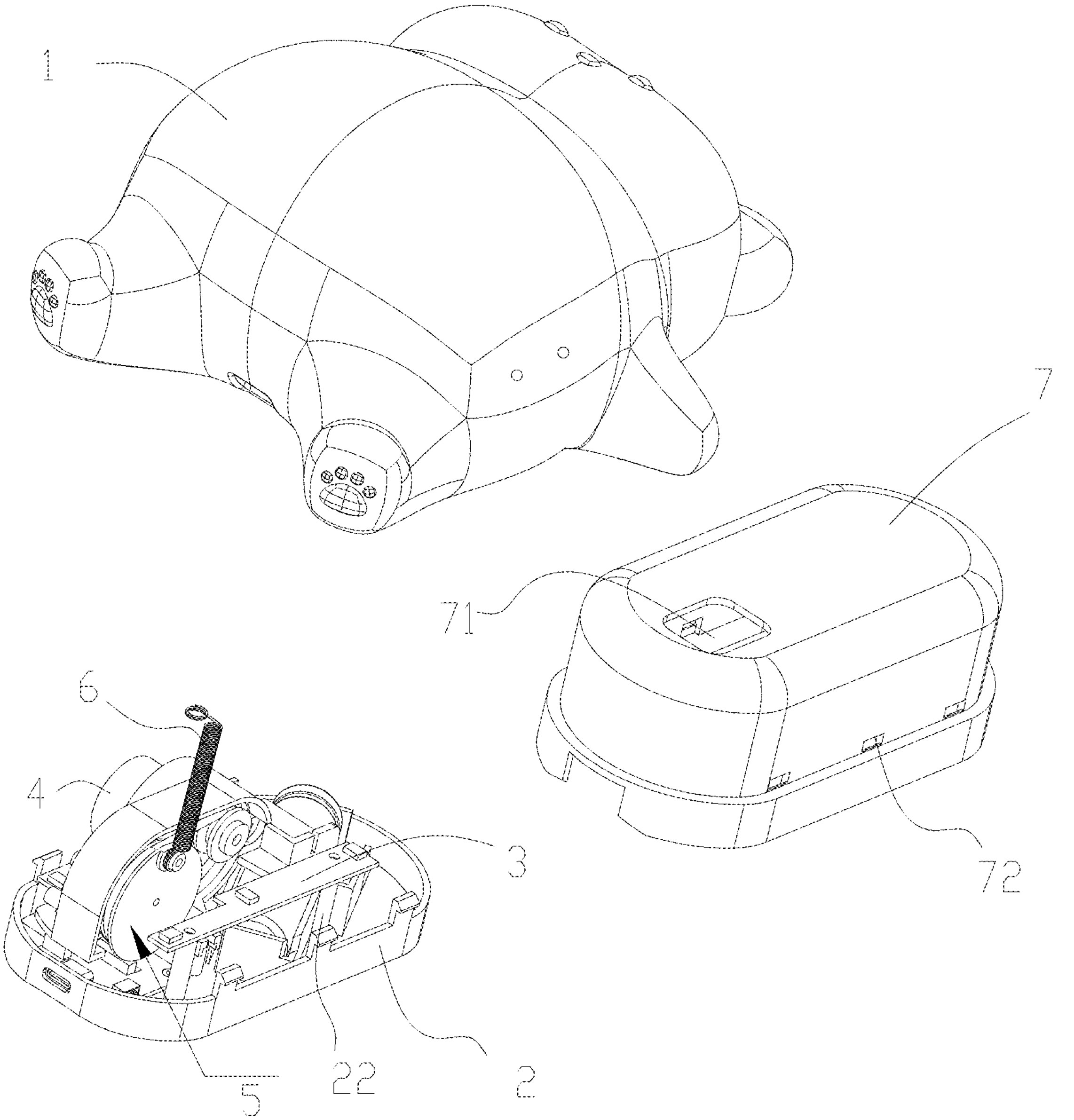
FIG. 2 is an exploded view 1 of a breathing lamp according to the present invention.

1. housing, 11. first retaining member, 12. annular groove, 121. second bayonet hole, 13. ventilation hole, 14. first region portion, 15. second region portion, and 16. second opening;
2. base, 21. inverted "L"-shaped hook, 211. hook portion, 22. support column, and 23. anti-skid pad;
3. light-emitting component
4. drive mechanism;
5. transmission mechanism, 51. first pulley, 52. second pulley, 521. second retaining member, and 53. belt;
6. pull rod, and 61. snap ring;
7. lampshade, 71. first opening, and 72. first bayonet hole;
8. power supply, and 81. power switch;
9. sensor;
10. positioning member; and
100. speaker.

DETAILED DESCRIPTION OF ILLUSTRATIVE EMBODIMENTS

In order to make the technical problems to be resolved, the used technical solutions, and the advantages to be achieved in the present invention clearer, the technical solutions in the embodiments of the present invention are further described below in detail with reference to the accompanying drawings. Obviously, the described embodiments are merely some of the embodiments of the present invention, rather than all of the embodiments. All other embodiments obtained by persons skilled in the art based on the embodiments of the present disclosure without creative efforts fall within the protection scope of the present disclosure.

In the description of the present invention, unless otherwise expressly specified and defined, "connected", "connection", and "fixed" should be understood in a broad sense, for example, fixedly connected, detachably connected or integrally connected; or mechanically connected or electrically connected; or connected directly or indirectly through an intermediate, or two elements communicated internally or two elements having mutual effects. A person of ordinary skill in the art may understand specific meanings of the foregoing terms in the present invention to specific cases.

In the present invention, unless expressly stated or limited otherwise, the expression of the first feature being "above" or "below" the second feature may include the case that the first feature is in direct contact with the second feature, and may also include the case that the first and second features are not in direct contact but are contacted via another feature therebetween. Furthermore, the first feature being "over", "above" or "on" the second feature includes the case that the first feature is directly or obliquely above the second feature, or merely indicates that the first feature is at a higher level than the second feature. The first feature being "below", "under" or "beneath" the second feature includes the case that the first feature is directly or obliquely below the second feature, or merely indicates that the first feature is at a smaller level than the second feature.

In the description of this embodiment, orientation or location relationships of terms such as "up", "down", "left", and "right" are based on orientation or location relationships shown in the accompanying drawings, and are only used to facilitate description and simplify operations, but are not used to indicate or imply that the apparatuses or elements must have specific orientations or are constructed and operated by using specific orientations, and therefore, cannot be understood as a limit to the present invention. In addition, the terms “first” and “second” are merely used for distinction in description and have no special meanings.

A preferred embodiment of this application provides a breathing lamp, including a housing, a base, and a light-emitting component. The housing is connected to the base. The light-emitting component is mounted on the base. The housing is made of a flexible material, for example, silicone, or rubber. A drive mechanism and a transmission mechanism are further mounted on the base, to enable the transmission mechanism to act on the housing to induce deformation of the housing. That is, the force of the transmission mechanism is transmitted to the housing to induce deformation of the housing, and with the cooperation of the light-emitting component, a dynamic breathing effect is formed.

As another preferred embodiment of this application, referring to FIG. 1 to FIG. 4, this application provides a breathing lamp, including a housing 1, a base 2, and a light-emitting component 3. The housing 1 is connected to the base 2, and the light-emitting component 3 is mounted on the base 2. The housing 1 is made of a flexible material, for example, silicone, or rubber. A drive mechanism 4 and a transmission mechanism 5 are further mounted on the base 2. In order to make it more convenient for the transmission mechanism 5 to act on the housing, a pull rod 6 is connected between the transmission mechanism 5 and the housing 1. The drive mechanism 4 drives the pull rod 6 through the transmission mechanism 5 to induce deformation of the housing 1. For example, the deformation may be displacement of the housing 1 in a vertical direction.

By adopting the technical solution above, the pull rod 6 of the device is driven by of the drive mechanism 4 to displace in the vertical direction, so that the housing 1 also rises and falls back and forth, thereby inducing deformation and forming a dynamic breathing effect.

Figure 6:
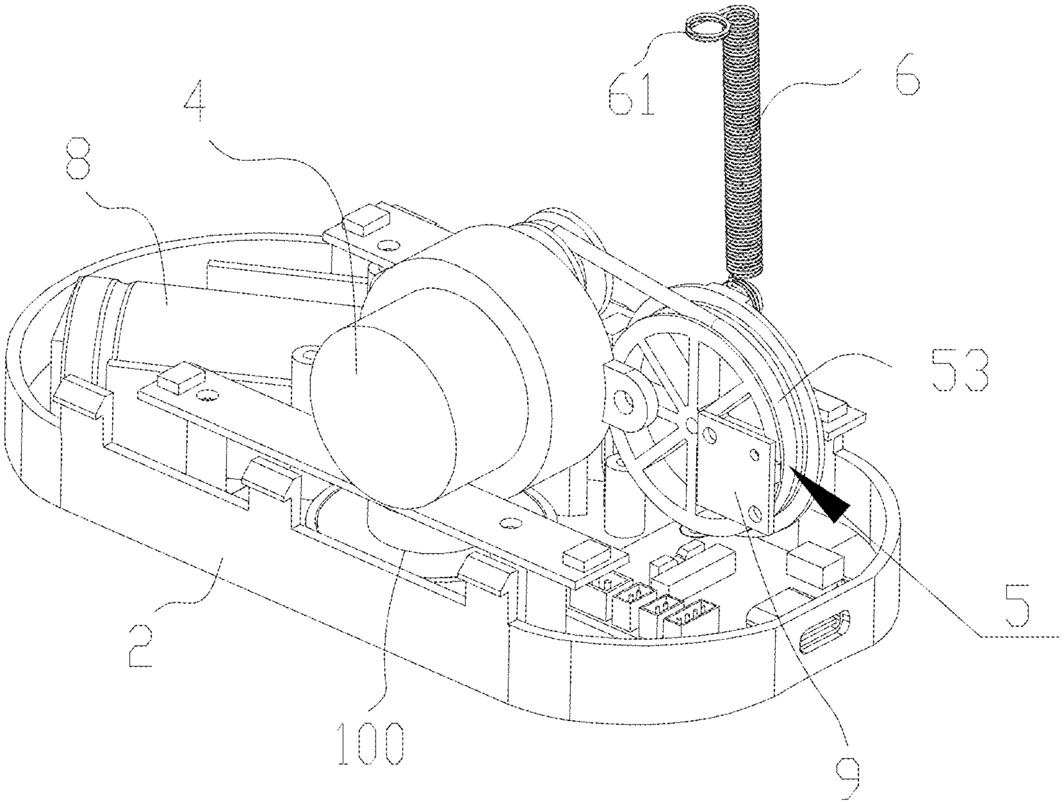
FIG. 6 is a schematic structural diagram 1 of a drive mechanism and a transmission mechanism according to the present invention.
Figure 7:
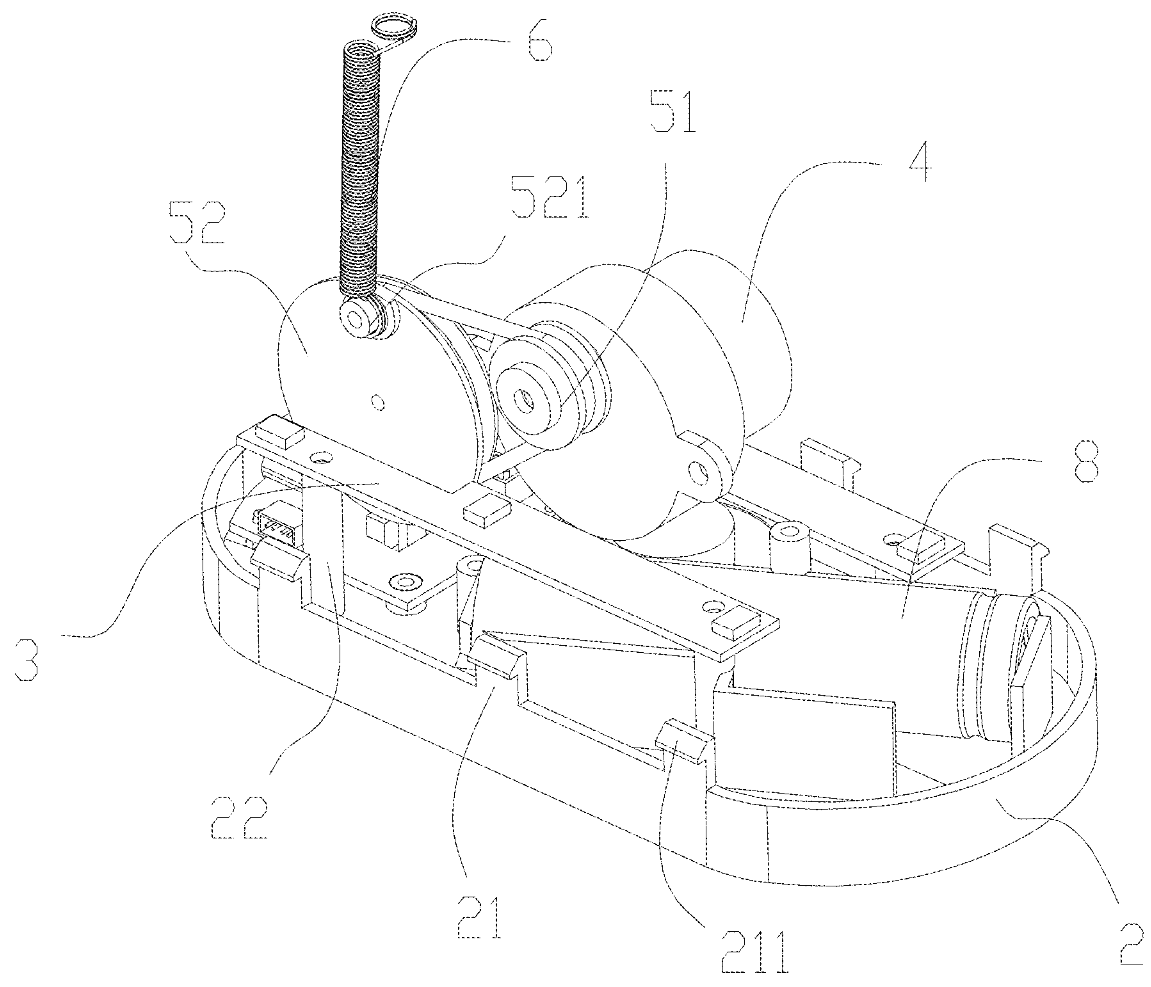
FIG. 7 is a schematic structural diagram 2 of a drive mechanism and a transmission mechanism according to the present invention.

Specifically, as shown in FIGS. 6 and 7, the drive mechanism 4 is a motor. Alternatively, the drive mechanism 4 may be another structure that produces rotational motion, for example, a rotary cylinder. The transmission mechanism 5 includes a first pulley 51, a second pulley 52, and a belt 53. The first pulley 51 is connected to an output shaft of the motor. The belt 53 is wrapped around the first pulley 51 and the second pulley 52.

Figure 3:
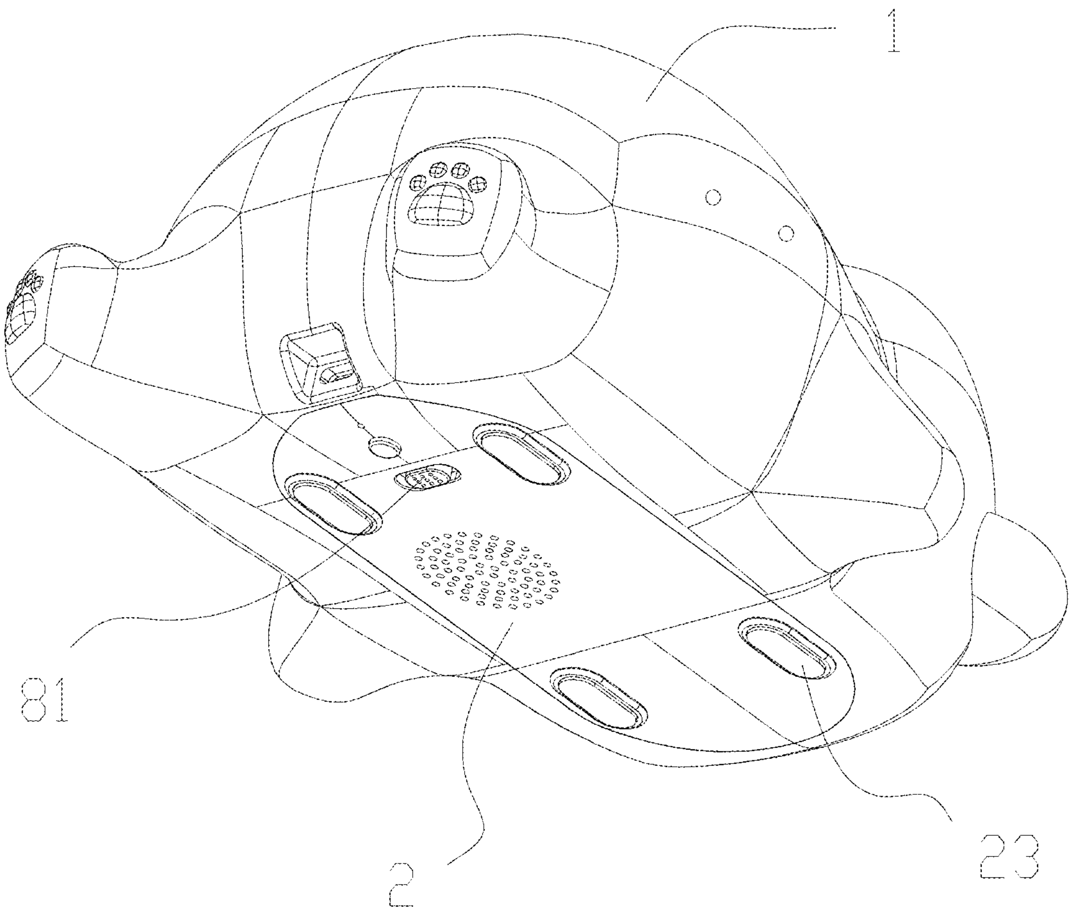
FIG. 3 is an overall schematic structural diagram 2 of a breathing lamp according to the present invention.
Figure 4:
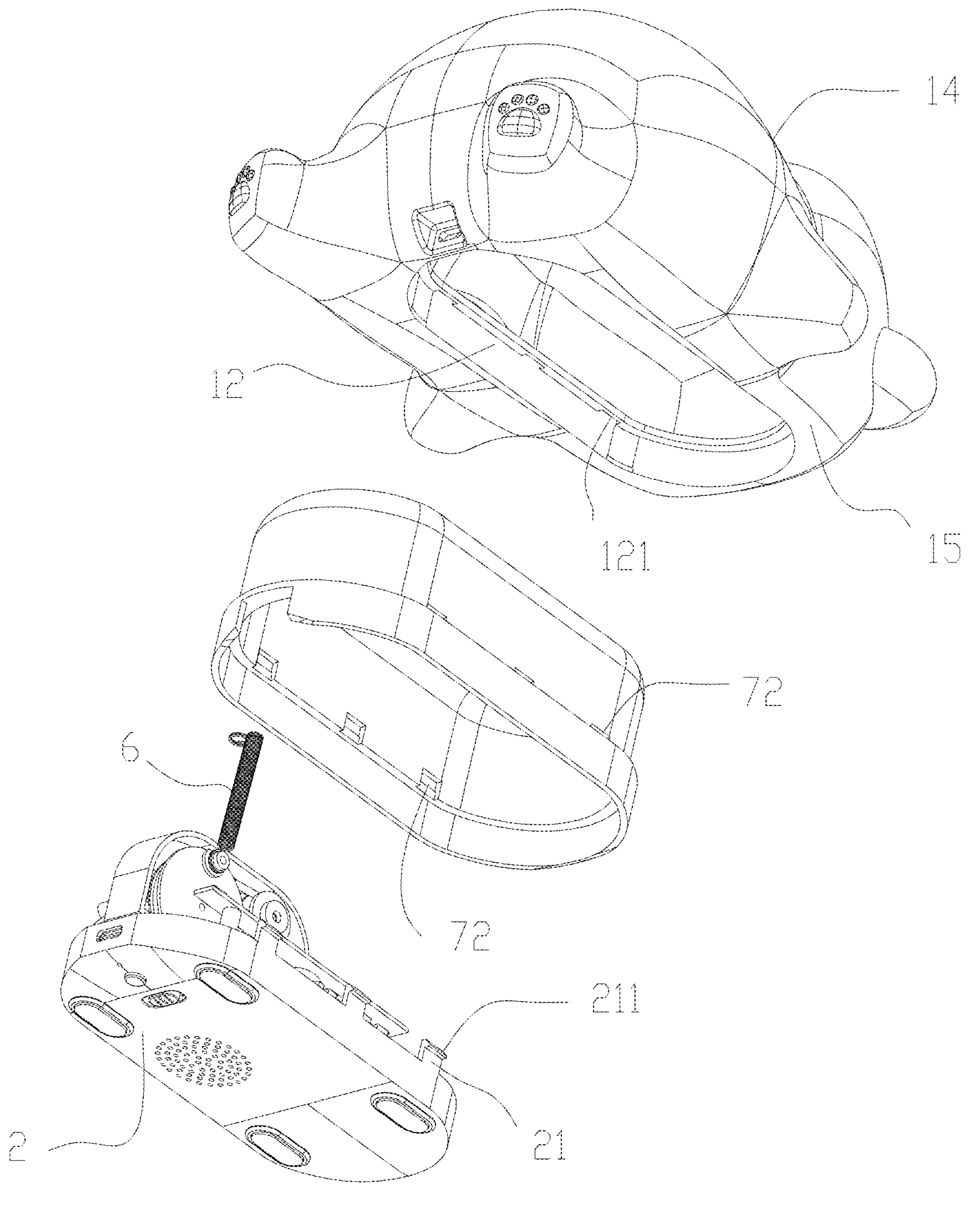
FIG. 4 is an exploded view 2 of a breathing lamp according to the present invention.
Figure 8:
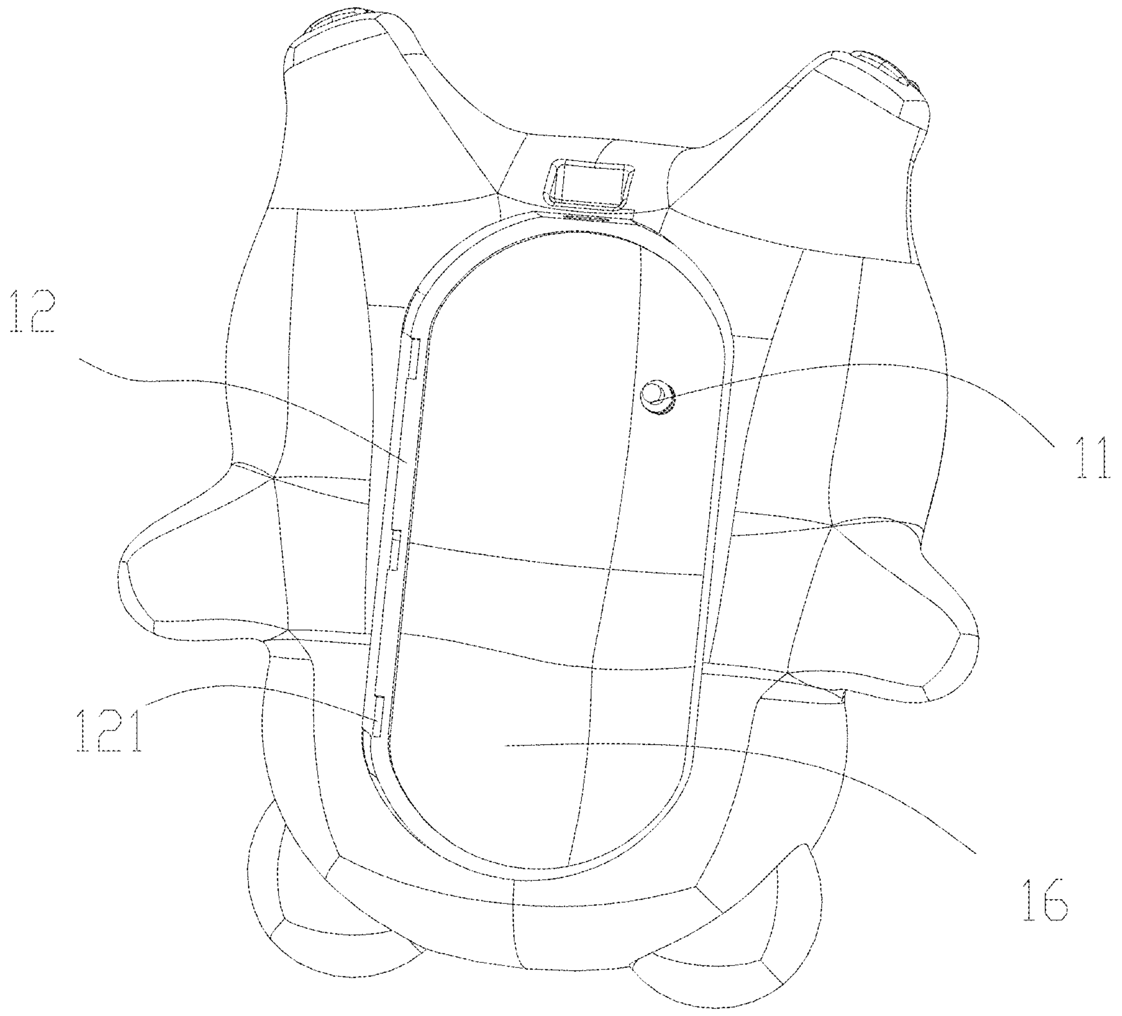
FIG. 8 is a schematic structural diagram of a housing according to the present invention.

Specifically, as shown in FIG. 3 and FIG. 8, a first retaining member 11 is provided on the housing 1. A second retaining member 521 is provided at a position of the second pulley 52 that deviates from an axis. Both ends of the pull rod 6 are respectively connected to the first retaining member 11 and the second retaining member 521.

Figure 5:
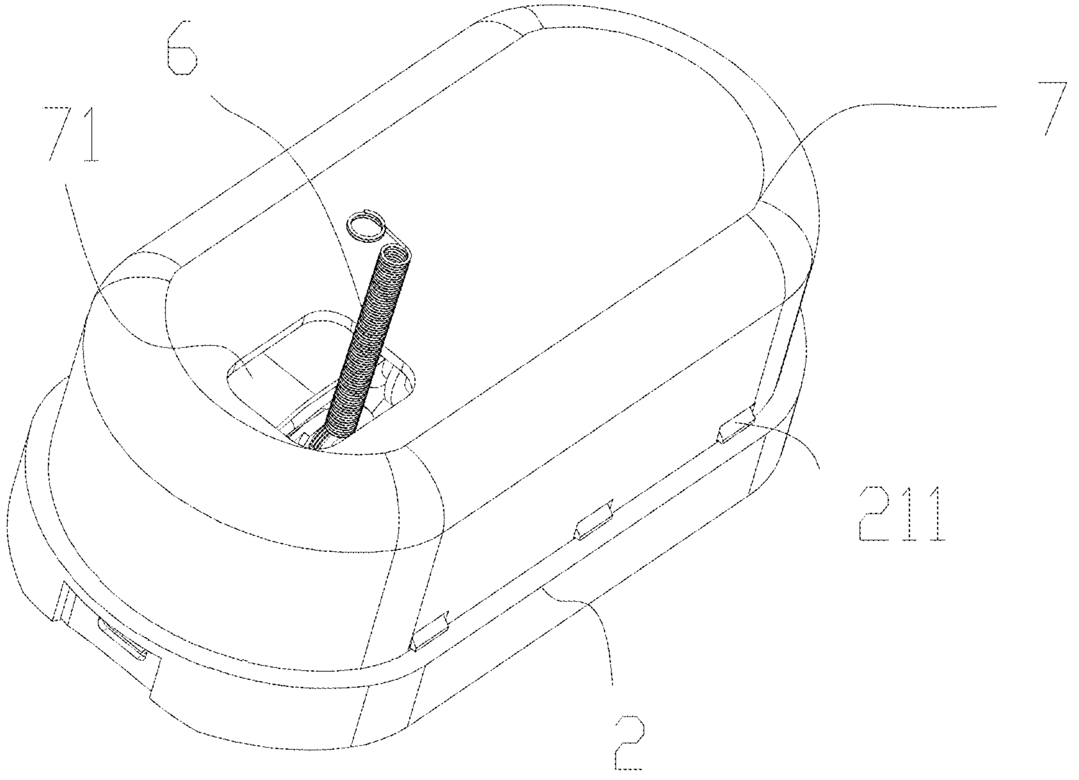
FIG. 5 is a schematic structural diagram of mounting a base and a lampshade according to the present invention.

Specifically, as shown in FIG. 5, a lampshade 7 is further mounted on the base 2. A first opening 71 is provided in the lampshade 7. The pull rod 6 is connected to the housing 1 after passing through the first opening 71.

Specifically, the lampshade 7 is made of transparent frosted material or a translucent frosted material. In this way, light generated by the light-emitting component 3 is softer, and light emitted by the light-emitting component 3 through the lampshade 7 does not hurt eyes and has more uniform brightness.

Specifically, as shown in FIG. 5 to FIG. 7, a plurality of inverted “L”-shaped hooks 21 are respectively provided on both sides of the base 2, a plurality of first bayonet holes 72 are provided in the lampshade 7, and each of the inverted “L”-shaped hooks 21 is clamped to one of the first bayonet holes 72.

Specifically, as shown in FIG. 5, an annular groove 12 is provided at a bottom of the housing 1, and a plurality of second bayonet holes 121 are provided in a side wall of the annular groove 12. The base 2 is inserted in the annular groove 12 after being assembled with the lampshade 7, and a hook portion 211 of the inverted “L”-shaped hook 21 is inserted in one of the second bayonet holes 121 after passing through the first bayonet hole 72. In this way, the device is convenient to mount, and only the inverted “L”-shaped hooks 21 need to be provided to connect the base 2 to both the lampshade 7 and the housing 1. Further, in the foregoing assembly manner, the base 2 may be mounted horizontally, and when using a product protected by the technical solution, horizontal placement can be achieved through the base 2.

It should be noted that, in order to accommodate the base 2, the bottom of the housing 1 is open, that is, the bottom of the housing includes a second opening 16.

Specifically, as shown in FIG. 3, the housing 1 includes a first region portion 14 connected to the base 2 and a second region portion 15 not connected to the base 2, and a thickness of the second region portion is less than or equal to a thickness of the first region portion. That is, a portion of the housing 1 of the device that is close to the base 2 is thicker, so that the housing 1 is more firmly mounted on the base 2.

Specifically, as shown in FIG. 1, a ventilation hole 13 is provided in the housing 1. The purpose of the ventilation hole 13 is to achieve air pressure balance inside and outside the housing 1. Under the action of the vertical movement of the pull rod 6, the connection between the housing 1 made of a flexible material and the pull rod 6 rises and falls back and forth to form a dynamic breathing effect. Without the ventilation hole 13, when the housing 1 of the device rises and falls, under the action of internal pressure, the base 2 tends to fall off, or air fails to enter the housing 1, resulting in pressure imbalance, causing the problem that the housing 1 fails to automatically restore its shape by elasticity.

Specifically, as shown in FIG. 6, the pull rod 6 is a spring pull rod. Preferably, a snap ring 61 is provided respectively at both ends of the spring pull rod, and each snap ring 61 is connected to the first retaining member 11 and the second retaining member 521. The advantage of choosing the spring pull rod as the pull rod of this application is that the spring pull rod is a non-rigid component. When subjected to external pressure, the spring bends and can dissipate the external force. Therefore, in some cases, damage to the housing and other internal structures of this application can be effectively prevented.

Specifically, as shown in FIG. 7, a plurality of support columns 22 are further provided on the base 2, and the light-emitting component 3 is mounted on the support columns 22. Further, in order to prevent the device from sliding when in use, an anti-skid pad 23 is further provided on a bottom surface of the base 2 of this application, and a plurality of anti-skid pads 23 are provided, and are evenly distributed on the bottom surface of the base 2.

Specifically, the light-emitting component 3 is an LED light board, and two LED light boards are provided, and are respectively arranged on both sides of the base 2, thereby achieving the purpose of evenly dispersing a light source and reducing a mounting area of the light boards.

Further, as shown in FIG. 6 to FIG. 10, a power supply 8, a power switch 81, and a sensor 9 are further provided on the base 2. When the power switch 8 is turned off, if the sensor 9 senses that the pull rod is in a non-preset position, the sensor 9 emits an electrical signal to enable the drive mechanism 4 to drive the pull rod 6 to a preset position through the transmission mechanism 5.

Figure 9:
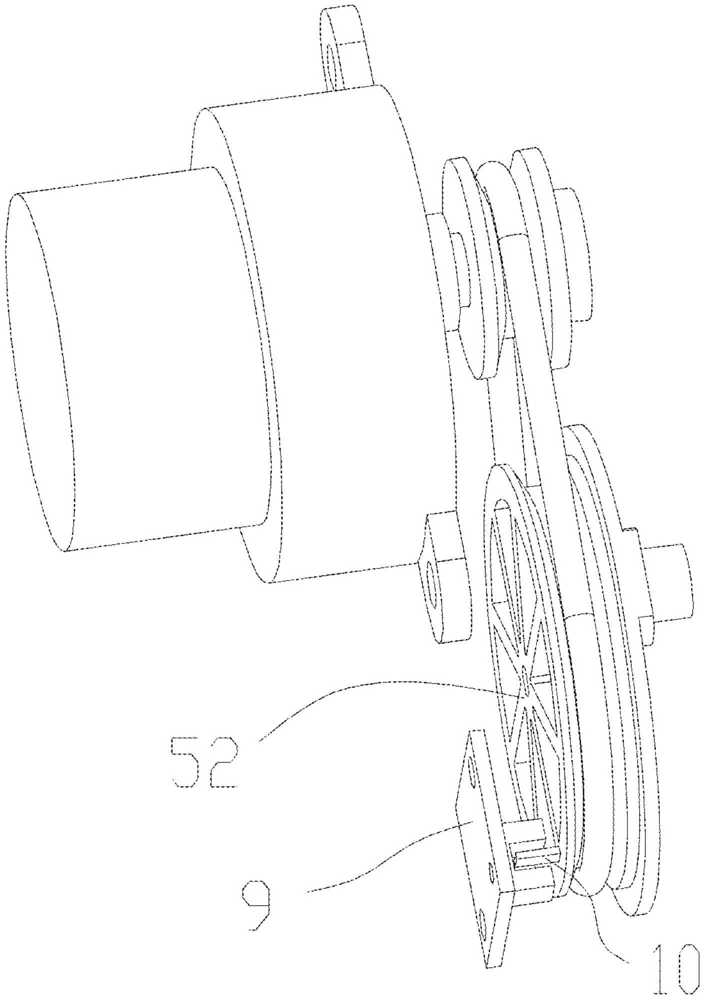
FIG. 9 is a schematic structural diagram 1 of a sensor and a positioning member according to the present invention.
Figure 10:
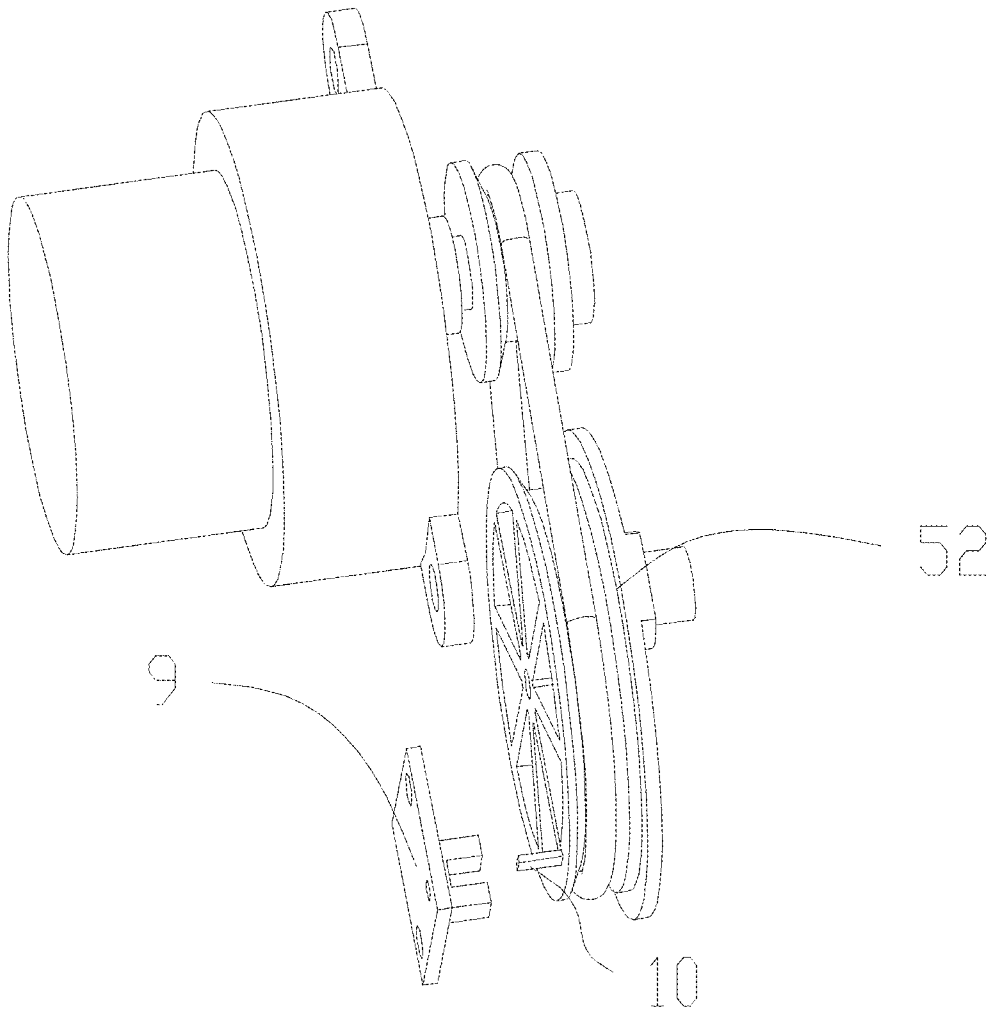
FIG. 10 is a schematic structural diagram 2 of a sensor and a positioning member according to the present invention.

Specifically, as shown in FIG. 9 and FIG. 10, the sensor 9 is a through-beam photoelectric switch. A positioning member 10 is further provided on the first pulley 51 or the second pulley 52. Preferably, the positioning member 10 is mounted at the second pulley 52. When the power switch 81 is turned off, if the electrical signal emitted by the through-beam photoelectric switch fails to act on the positioning member 10, the drive mechanism 5 operates and drives the first pulley 51 and/or the second pulley 52 to rotate to change a position of the positioning member 10 until the electrical signal emitted by the through-beam photoelectric switch successfully acts on the positioning member 10. The purpose of the arrangement is that when the device does not operate, the shape of the housing 1 is restored, thereby enhancing the aesthetic appeal and decorative value of the breathing lamp in its static state. The breathing lamp protected based on this application may also be used as a household decorative component. Therefore, the aesthetic appeal and decorative value are also advantages of the device.

It should be noted that the through-beam photoelectric switch is formed by a transmitter and a receiver, and is directly obtained from existing technologies. The operating principle of the through-beam photoelectric switch is that light emitted by the transmitter directly enters the receiver. When a detected object passes between the transmitter and the receiver and blocks the light, the photoelectric switch generates a switch signal. "The electrical signal emitted by the through-beam photoelectric switch successfully acts on the positioning member" stated in this application specifically means that the positioning member 10 is located between the transmitter and the receiver of the through-beam photoelectric switch and can block light passing therebetween. In this case, the through-beam photoelectric switch is triggered to generate a related electrical signal and transfer the electrical signal to the drive mechanism.

Specifically, as shown in FIG. 6, a speaker 100 is further mounted on the base 2, and the power supply 8 is respectively electrically connected to the light-emitting component 3, the speaker 100, and the sensor 9. Different music can be played through the speaker 100 to enhance the fun.

Specifically, as shown in FIG. 6, the power supply 8 is a cylindrical battery, and is mounted obliquely on the base 2. The cylindrical battery and a side of the base form a particular angle in a horizontal direction, which is called "obliquely". This can save internal space and make the product structure more compact and smaller.

Specifically, the housing 1 and the first retaining member 11 are integrally formed, thereby improving the convenience of assembly.

The operating principle of the present invention is as follows: An example in which the housing 1 is designed in the shape of a panda is used. The housing is made of a silicone material, and the first retaining member 11 is provided inside the housing 1, specifically, may be provided at the belly of the panda, thereby enhancing the fun. When the power switch 81 is turned on, the device is started. The motor 4 drives the first pulley 51 to rotate. The first pulley 51 transmits the rotational power to the second pulley 52 through the belt 53. The second retaining member 521 is provided at an eccentric position (which may be a wheel edge position) of the second pulley 52. As the second pulley 52 rotates, the pull rod 6 at least displaces in the vertical direction. When the pull rod 6 moves downward, the interior of the housing 1 also moves downward due to a downward pulling force, that is, downward deformation is generated. When the pull rod 6 moves upward, the interior of the housing 1 also moves upward due to an upward force or its own elasticity, that is, upward deformation is generated. In this way, the housing 1 can rise and fall back and forth, and with the cooperation of LED light of the light-emitting component 3, the device can form a dynamic breathing light effect.

When the device is not in use, the power switch 81 can be turned off. In this case, the through-beam photoelectric switch performs detection. If the electrical signal emitted by the through-beam photoelectric switch fails to act on the positioning member 10, the motor 4 continues to operate and drives the second pulley 52 to rotate to change the position of the positioning member 10 until the electrical signal emitted by the through-beam photoelectric switch successfully acts on the positioning member 10, so that the pull rod 6 and the housing 1 can be automatically reset.

It should be noted that, the above description only provides preferred embodiments of the present invention and the employed technical principles. It should be appreciated by those skilled in the art that the present invention is not limited to the particular embodiments described herein. Those skilled in the art may make various obvious changes, readjustments, and replacements without departing from the scope of protection of the present invention. Therefore, while the present invention is illustrated in detail in combination with the above embodiments, the present invention is not only limited to the above embodiments, and can further include more other equivalent embodiments without departing from the concept of the present invention. The scope of the present invention is defined by the scope of the appended claims.

The invention claimed is:

1. A breathing lamp, comprising: a housing, a base, and a light-emitting component, wherein the housing is connected to the base, the light-emitting component is mounted on the base, and the housing is made of a flexible material;

a drive mechanism and a transmission mechanism are further mounted on the base, and a pull rod is connected between the transmission mechanism and the housing; and the drive mechanism drives the pull rod through the transmission mechanism to induce deformation of the housing;

wherein a power supply a power switch, and a sensor are further provided on the base; and when the power switch is turned off, and the sensor senses that the pull rod is in a non-preset position, the sensor emits an electrical signal to enable the drive mechanism to drive the pull rod to a preset position through the transmission mechanism.

2. The breathing lamp according to claim 1, wherein the drive mechanism is a motor, the transmission mechanism comprises a first pulley, a second pulley, and a belt, the first pulley is connected to an output shaft of the motor, and the belt is wrapped around the first pulley and the second pulley.

3. The breathing lamp according to claim 2, wherein a first retaining member is provided on the housing, a second retaining member is provided at a position of the second pulley that deviates from an axis, and both ends of the pull rod are respectively connected to the first retaining member and the second retaining member.

4. The breathing lamp according to claim 1, wherein a lampshade is further mounted on the base, a first opening is provided in the lampshade, and the pull rod is connected to the housing after passing through the first opening.

5. The breathing lamp according to claim 4, wherein the lampshade is made of a transparent frosted material or a translucent frosted material.

6. The breathing lamp according to claim 4, wherein a plurality of inverted "L"-shaped hooks are respectively provided on both sides of the base, a plurality of first bayonet holes are provided in the lampshade, and each of the inverted "L"-shaped hooks is clamped to one of the first bayonet holes.

7. The breathing lamp according to claim 6, wherein an annular groove is provided at a bottom of the housing, a plurality of second bayonet holes are provided in a side wall of the annular groove, the base is inserted in the annular groove after being assembled with the lampshade, and a hook portion of the inverted "L"-shaped hook is inserted in one of the second bayonet holes after passing through the first bayonet hole.

8. The breathing lamp according to claim 1, wherein the housing comprises a first region portion and a second region portion, and a thickness of the second region portion is less than or equal to a thickness of the first region portion.

9. The breathing lamp according to claim 1, wherein a ventilation hole is provided in the housing.

10. The breathing lamp according to claim 1, wherein the pull rod is a spring pull rod.

11. The breathing lamp according to claim 1, wherein a plurality of support columns are further provided on the base, and the light-emitting component is mounted on the support columns.

12. The breathing lamp according to claim 11, wherein the light-emitting component is an LED light board, and two LED light boards are provided, and are respectively arranged on both sides of the base.

13. The breathing lamp according to claim 1, wherein the sensor is a through-beam photoelectric switch, and a positioning member is further provided on the first pulley or the second pulley; and when the power switch is turned off, and when the electrical signal emitted by the through-beam photoelectric switch fails to act on the positioning member, the drive mechanism operates and drives the first pulley and/or the second pulley to rotate to change a position of the positioning member until the electrical signal emitted by the through-beam photoelectric switch successfully acts on the positioning member.

14. The breathing lamp according to claim 1, wherein a speaker is further mounted on the base, and the power supply is electrically connected to the light-emitting component, the speaker, and the sensor, respectively.

15. The breathing lamp according to claim 14, wherein the power supply is a cylindrical battery, which is mounted obliquely on the base.

16. The breathing lamp according to claim 3, wherein the housing and the first retaining member are integrally formed.

* * * * *